US010348556B2

(12) United States Patent
Cheng et al.

(10) Patent No.: US 10,348,556 B2
(45) Date of Patent: Jul. 9, 2019

(54) METHOD AND NETWORK INFRASTRUCTURE FOR A DIRECT PUBLIC TRAFFIC CONNECTION WITHIN A DATACENTER

(71) Applicant: Alibaba Group Holding Limited, Grand Cayman (KY)

(72) Inventors: Gang Cheng, Bellevue, WA (US); Hong Tang, San Jose, CA (US); Jiesheng Wu, Redmond, WA (US)

(73) Assignee: Alibaba Group Holding Limited (KY)

( * ) Notice: Subject to any disclaimer, the term of this patent is extended or adjusted under 35 U.S.C. 154(b) by 175 days.

(21) Appl. No.: 15/171,845

(22) Filed: Jun. 2, 2016

(65) Prior Publication Data

US 2017/0353351 A1    Dec. 7, 2017

(51) Int. Cl.
*H04L 12/24* (2006.01)
*H04L 29/08* (2006.01)
*H04L 12/46* (2006.01)
*H04L 29/12* (2006.01)

(52) U.S. Cl.
CPC ...... *H04L 41/0803* (2013.01); *H04L 12/4625* (2013.01); *H04L 12/4633* (2013.01); *H04L 12/4641* (2013.01); *H04L 61/2007* (2013.01); *H04L 61/2061* (2013.01); *H04L 67/1002* (2013.01)

(58) Field of Classification Search
CPC ......... H04L 67/10; H04L 67/22; H04L 67/02; H04L 63/0272; H04L 61/2007; H04L 63/20; H04L 67/42; H04L 67/306; H04L 12/4633; H04L 41/50; H04L 63/08; H04L 67/34; H04L 41/12; H04L 67/20; H04L 63/0428; H04L 67/146
See application file for complete search history.

(56) References Cited

U.S. PATENT DOCUMENTS

| 2014/0331309 A1* | 11/2014 | Spiers | H04L 63/0218 |
| | | | 726/12 |
| 2014/0334495 A1* | 11/2014 | Stubberfield | H04L 49/354 |
| | | | 370/401 |
| 2016/0285782 A1* | 9/2016 | Schultze | H04L 41/00 |
| 2016/0344798 A1* | 11/2016 | Kapila | H04L 67/34 |
| 2017/0118041 A1* | 4/2017 | Bhattacharya | H04L 12/462 |
| 2018/0041443 A1* | 2/2018 | Xiao | H04L 61/2532 |

* cited by examiner

*Primary Examiner* — Djenane M Bayard
(74) *Attorney, Agent, or Firm* — Lee & Hayes, P.C.

(57) ABSTRACT

A network system includes a datacenter including a gateway router configured to route data transmissions of public network traffic to and from a plurality of VPCs hosted by the datacenter. A first VPC is configured to communicate with the gateway router. The first VPC is accessible and identifiable via a first public IP address. A second VPC is configured to communicate with the gateway router, and the second VPC is accessible and identifiable via a second public IP address. A direct connection transmits a particular data transmission based on the first public IP address and the second public IP address, directly between the first VPC and the second VPC so as to bypass the gateway router. The first public IP address and the second public IP address are assigned from among a group of public IP addresses allocated for assignment to VPCs hosted by the datacenter.

24 Claims, 5 Drawing Sheets

METHOD AND NETWORK INFRASTRUCTURE FOR A DIRECT PUBLIC TRAFFIC CONNECTION WITHIN A DATACENTER

BACKGROUND

Various types of cloud services with public internet access are hosted inside the datacenters of cloud service providers. For example, cloud services such as web services, storage, and virtual machines ("VM") for business needs, may be accessible via a cloud service provider. Due to the facts that there are so many public Internet Protocol addresses ("IP addresses") and that datacenter switches have limited hardware resources, (e.g., routing table), the cloud datacenter network is designed so that the public IP addresses are aggregated and announced by intermediary devices, such as gateway routers, server load balancing devices ("SLB"), and switches, which may be either virtual or physical. For convenience in this document, unless otherwise specified, these types of intermediary devices may be referred to as gateway devices herein.

Thus, all public network traffic, including public network traffic originating from the inside datacenter, ends up passing through the gateway device before being forwarded to the desired end destination. In addition, conventional datacenter network architectures are External Border Gateway Protocol ("BGP" or "eBGP") based layer-3 Clos network architectures. Since public IP addresses are announced using BGP protocol in the network, a data packet ("packet") with the public IP address end destination cannot be routed to the destination automatically or directly. Therefore, the gateway device forwards the packet to the end destination via tunnels, such as Virtual Extensible Local Area Network tunneling technology ("VXLAN"), Generic Routing Encapsulation ("GRE"), and IP in IP tunnels. When the server or host receives the packet, the packet is processed before being delivered to the final end destination, which may be a cloud service process or a VM. In the instance where the end destination is a VM in a virtual private cloud ("VPC"), a virtual switch ("vSwitch") hosted on the server generally processes the packet. It is noted, however, that depending on the network design, some of the outgoing network traffic may not go through the gateway device.

In the event that multiple packets are entering and being forwarded by a gateway device and are destined to one public IP address in a cloud datacenter, the gateway device becomes a bottleneck and a single point failure for the public network traffic. Such a network design introduces more and more latency as the packets need to be forwarded to the gateway devices first.

Recently, VXLAN tunneling technology has become more and more popular. This protocol was developed in part due to the fact that the traditional virtual local area network ("VLAN") protocol can only support a maximum of 4096 users, which is insufficient in modern busy datacenters, where each is assigned a unique VLAN.

SUMMARY

This summary is provided to introduce simplified concepts of direct public networking within a datacenter, which are further described below in the Detailed Description. This summary is not intended to identify essential features of the claimed subject matter, nor is it intended for use in determining the scope of the claimed subject matter.

In an embodiment of the instant application, a network infrastructure system includes a datacenter including a gateway router configured to route data transmissions of public network traffic to and from a plurality of VPCs hosted by the datacenter. A first VPC of the plurality of VPCs is configured to communicate with the gateway router. The first VPC is accessible and identifiable via a first public IP address. A second VPC of the plurality of VPCs is also configured to communicate with the gateway router. The second VPC is accessible and identifiable via a second public IP address. The network infrastructure system further includes a direct connection configured to transmit a particular data transmission based on the first public IP address and the second public IP address, directly between the first VPC and the second VPC so as to bypass the gateway router. The first public IP address and the second public IP address are assigned from among a group of public IP addresses allocated for assignment to VPCs hosted by the datacenter.

In another embodiment of the instant application, a system includes a plurality of VPCs hosted by a regional datacenter including a gateway router configured to transmit data transmissions of public network traffic to and from the plurality of VPCs. A distinct public IP address is assigned to at least two VPCs of the plurality of VPCs, respectively. The public IP addresses are assigned from among a group of public IP addresses allocated for assignment to VPCs internally hosted by the regional datacenter. The at least two VPCs are accessible and identifiable, via the gateway router, to network-enabled devices located internal to the regional datacenter and network-enabled devices located external to the regional datacenter. For each distinct pair of VPCs having distinct public IP addresses, including the at least two VPCs, the system further includes a direct connection configured to transmit a particular data transmission directly between the distinct pair of VPCs so as to bypass the gateway router.

In an embodiment of a method of directly routing network traffic between VPCs within a datacenter, according to the instant application, the method includes the following steps. A switch of a first VPC in the datacenter receives a data transmission from a VM that is included in the first VPC. The first VPC is configured to communicate with a gateway router in the datacenter, and the first VPC is accessible and identifiable via a first public IP address. Further, the switch of the first VPC determines whether to send the data transmission to a destination via the gateway router or via a direct connection between the first VPC and a second VPC in the datacenter. The second VPC is configured to communicate with the gateway router, and the second VPC is accessible and identifiable via a second public IP address. A particular data transmission is sent based on the first public IP address and the second public IP address, directly between the first VPC and the second VPC via the direct connection, so as to bypass the gateway router. The first public IP address and the second public IP address are assigned from among a group of public IP addresses allocated for assignment to VPCs hosted by the datacenter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to providing a direct network connection between a pair of VPCs within a datacenter. With the development of cloud computing, more and more public Internet users have started to use VMs/cloud services hosted in datacenters. Further, this means that there is an increased occurrence of public network traffic between two points or VPCs that are internal to a single datacenter. More specifically, this disclosure is directed to public network traffic between two public internet IP addresses within the same datacenter.

As discussed above, due to network limitations, such as the size of a routing table in switches, cloud service providers utilize gateway devices to announce aggregated public IP address ranges. Further, these devices are also used as the gateway for forwarding public internet traffic packets, including internal public traffic packets. Thus, these gateway devices become a bottleneck and potential point failures for the public traffic.

This application describes at least a partial solution to the above issue by enabling internal public network traffic to communicate directly between the source and the destination without going through the gateway device. By doing so, network performance (latency and throughput) for internal public traffic is improved, network resources are conserved, the network is more robust, and customer satisfaction may be improved.

Illustrative Embodiments of a Network Architecture

Figure 1:
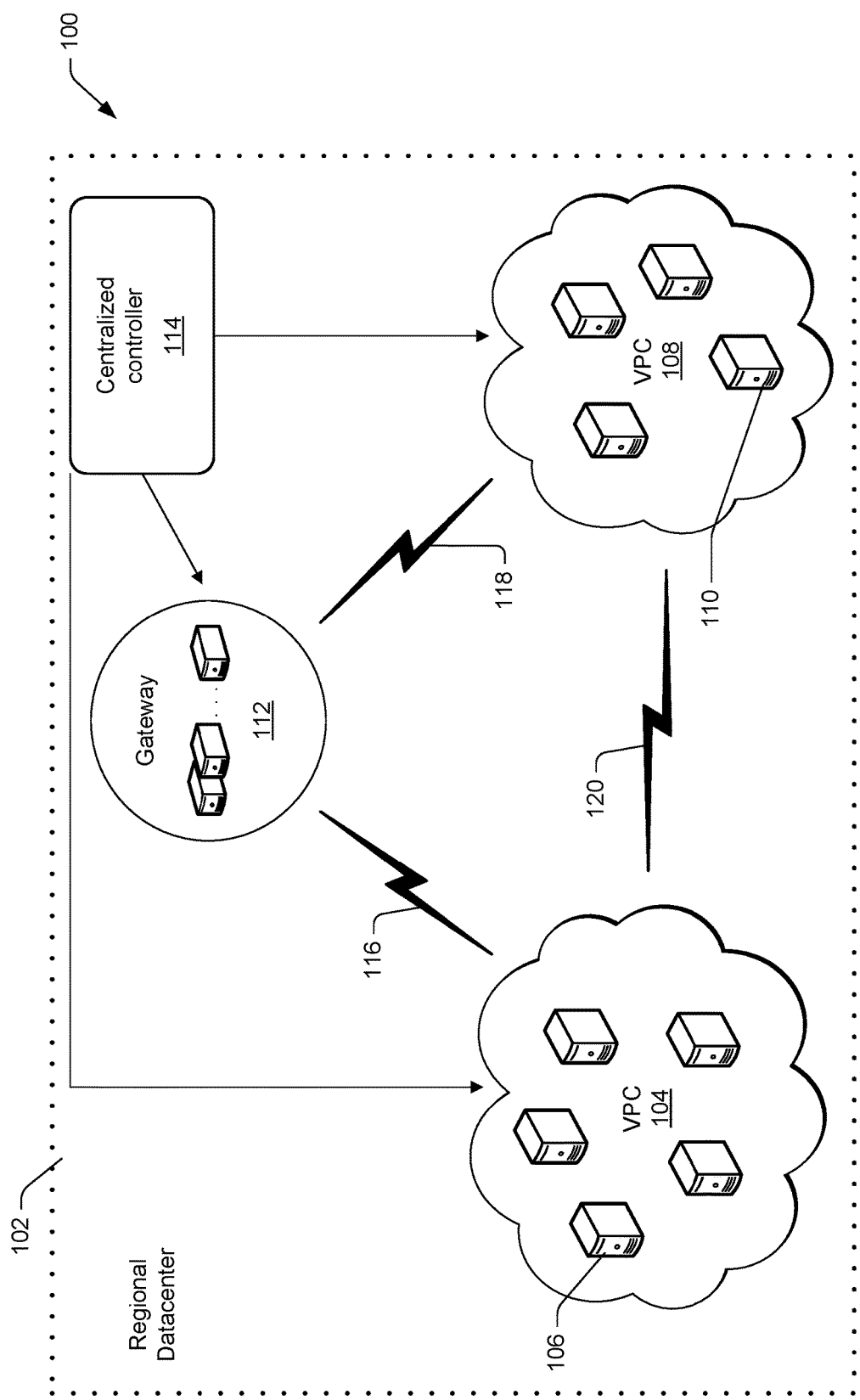
FIG. 1 illustrates an embodiment of a network architecture according to the instant application.

In FIG. 1, a network architecture 100 according to the instant application is depicted. The network architecture 100 may be formed within a regional datacenter 102. Regional datacenter 102 may include a multiplicity of datacenter entities. For example, in some instances, regional datacenter 102 may include a plurality of VPCs (as depicted), such as VPC 104 having at least one VM 106 and VPC 108 having at least one VM 110. The datacenter entities may also include VMs, web service providers, storage service providers, etc. While some entities may be restricted to a particular group of users via a private secured access, other entities may be publicly accessible via a public IP address. In accordance with the instant application, the multiple entities may further be able to communicate directly with each other without having the data transmissions pass through an intermediary gateway router 112 of the datacenter 102 that is common between the entities.

Additionally, in some instances, VPC 104, VPC 106, and gateway router 112 are all in communication with a centralized controller 114, as discussed further herein. In general, VPC 104 may send data transmissions to an IP address outside of the datacenter 102, and receive data transmissions from an IP address outside the datacenter 102, via a connection 116 between VPC 104 and gateway router 112. Likewise, VPC 104 may send data transmissions to an IP address outside of the datacenter 102, and receive data transmissions from an IP address outside the datacenter 102, via a connection 118 between VPC 108 and gateway router 112. However, as explained in greater detail herein, if a data transmission is intended to be sent between VPC 104 and VPC 108 based on the public IP address, the data transmission may be sent directly via a direct connection 120.

Generally, datacenter 102 may assign a public IP address to an entity therein from among a group of public IP addresses allocated for assignment to entities, such as VPC 104 and VPC 108, hosted by the datacenter 102. The public IP address provides users with remote access to the particular entity having that particular public IP address. Therefore, VPC 104 is assigned a first public IP address and VPC 108 is assigned a second, distinct, public IP address. Accordingly, a user may access VPC 104 via a network-enabled computing device by communicating with the first public IP address, i.e., sending network communication data transmissions including packets that identify the first public IP address as the end destination. Similarly, a user may access VPC 108 via a network-enabled computing device by communicating with the second public IP address, i.e., sending network communication data transmissions including packets that identify the second public IP address as the end destination.

In order to facilitate public access to VPC 102 and VPC 108, gateway router 112 and centralized controller 114 may both announce the first and second public IP addresses, as they are associated with access to the entity services available on VPC 104 and VPC 108. Furthermore, this information may be retained via a cache memory (not depicted) associated with gateway router 112 and centralized controller 114, respectively. Public access is further enhanced by direct connection 120, which permits data transmissions directly between VPC 104 and VPC 108 without having to route the data transmission through gateway router 112. Direct connection 120 assists in reducing the amount of network traffic being routed through gateway 112, thereby reducing network traffic bottlenecking in gateway router 112 and latency associated therewith. Direct connection 120 is utilized when VPC 104 and/or VPC 108 determine that the first and second public IP addresses are both assigned within the same datacenter.

Direct connection 120 is enhanced by the implementation of VXLAN tunneling technologies. As such, greater speeds, bandwidth, and security of exchanges between VPC 104 and VPC 108 may be achieved. Moreover, direct connection 120 is assigned a globally unique VXLAN ID. The data transmissions therebetween may thus be identified for transmission through direct connection 120 by encapsulation of the data using the unique VXLAN ID assigned to that particular direct connection 120.

Figure 2:
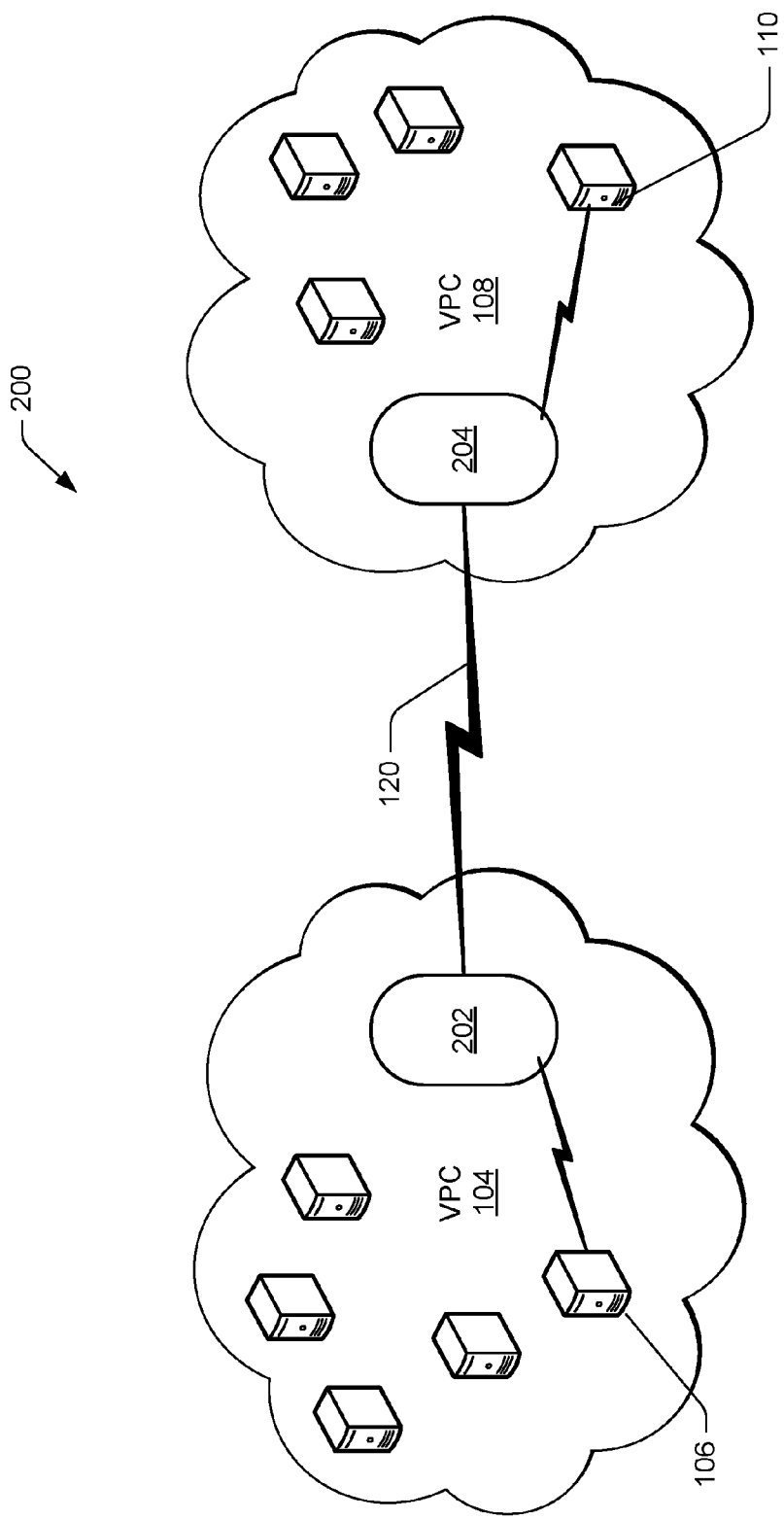
FIG. 2 illustrates an embodiment of further details of a network architecture according to FIG. 1 of the instant application.

Referring now to FIG. 2, additional details of direct connection 120 are described. Specifically, FIG. 2 shows network architecture 200 including VPC 104 with VM 106 and VPC 108 with VM 110. VPC 104 includes a switch 202 that sends and receives data transmission from VM 106, which data transmission is communicated to a switch 204 in VPC 108, and subsequently to VM 110. Switch 202 and switch 204 may be virtual switches ("vSwitch") or physical switches. Notably, all data transmissions into or out of a datacenter entity go through the switch of the entity.

Switch 202 and switch 204 each maintain an internal routing table. The routing table(s) are used to determine whether the public IP address of the end-destination of a data transmission is assigned to an entity within the datacenter, i.e., the entity has a public IP address assigned from among the group of public IP addresses allocated for assignment to entities hosted by the datacenter. In a first case, where the end-destination associated with the data transmission has a public IP address to which the sending/receiving entity has previously sent a data transmission, or from which the sending/receiving entity has previously received a data transmission, a record of that exchange may have been recorded in the routing table of the switch. As such, in the first case, the sending switch may automatically determine whether to send the data via the gateway device or the direct connection with another entity in the datacenter. Moreover, the routing table may store the globally unique VXLAN IDs of direct connections within the datacenter, and may store the public IP addresses of those end-destinations outside of the datacenter. Additionally, and/or alternatively, the routing table may store only the globally unique VXLAN IDs of direct connections within the datacenter.

In a second case, where the end-destination associated with the data transmission has a public IP address to which the sending/receiving entity has not previously sent a data transmission, or from which the sending/receiving entity has not previously received a data transmission, the routing table of the switch may be updated to include that exchange. In the second case, if the routing table does not include a record of the end-destination (and thus, the routing pathway) of the data transmission, the switch may inquire with the centralized controller and/or the gateway router to determine the manner in which to send the data transmission. When updating the routing table in the switch, the routing table may update and store the globally unique VXLAN IDs of direct connections within the datacenter, and may update and store the public IP addresses of those end-destinations outside of the datacenter. Additionally, and/or alternatively, the routing table may update and store only the globally unique VXLAN IDs of direct connections within the datacenter.

Another function of switch 202 and switch 204 is to perform the VXLAN encapsulation and decapsulation of the data transmission prior to sending a data transmission or after receiving a data transmission, respectively. Furthermore, a switch of a datacenter entity may be responsible for load balancing the data transmissions.

Figure 3:
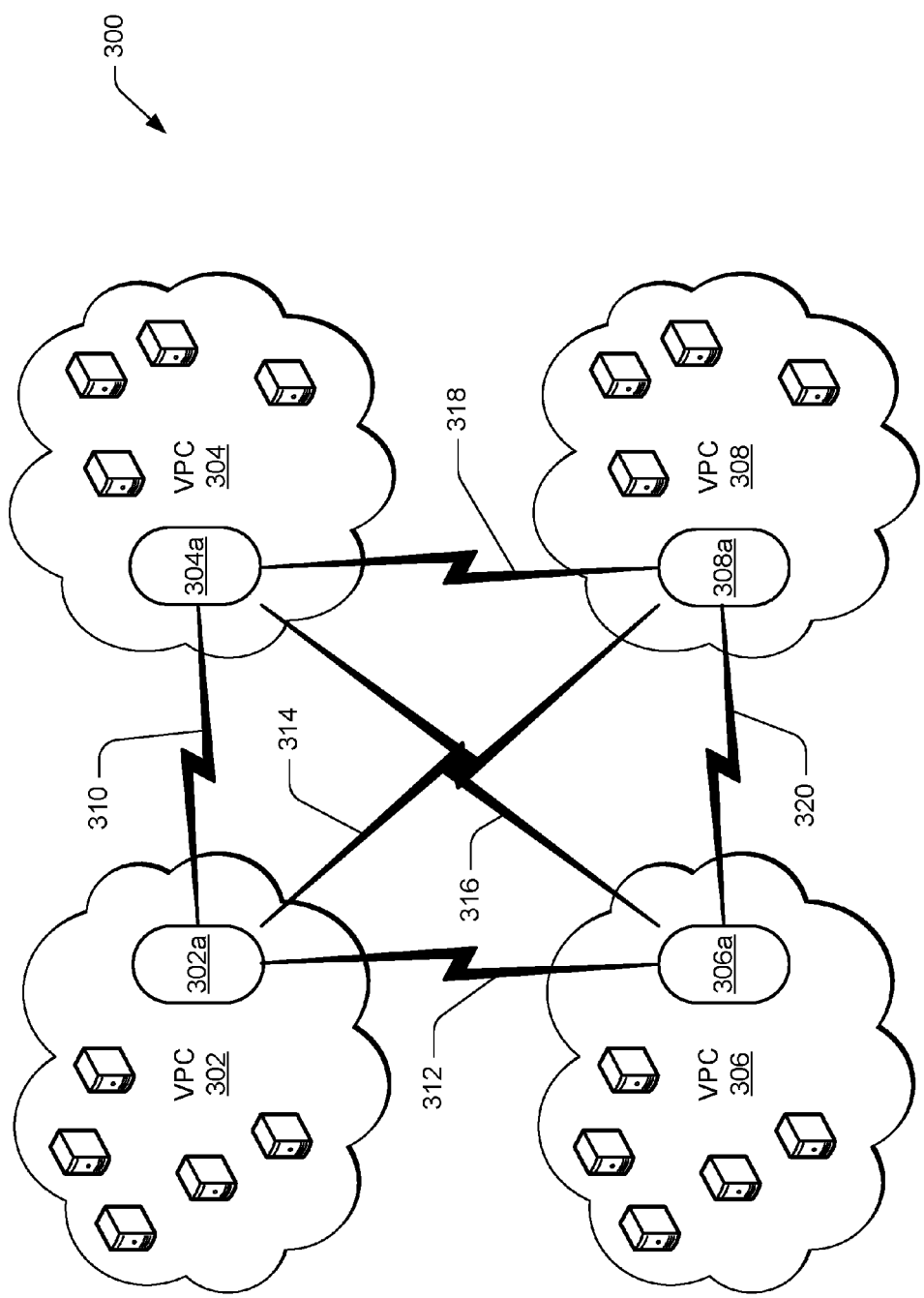
FIG. 3 illustrates an embodiment of a network architecture according to the instant application.

In FIG. 3, an example of a regional datacenter 300 having multiple entities, VPCs 302, 304, 306, and 308, is shown. Note that each of the VPCs 302, 304, 306, and 308 has a switch 302a, 304a, 306a, and 308a, respectively, via which data transmissions are routed. Additionally, in a case where multiple entities within a datacenter are exchanging data transmissions via the assigned public IP addresses, each pair of entities uses a unique direct connection for the data transmissions. For example, as shown in FIG. 3, for a data transmission between VPC 302 and VPC 304, there is a unique direct connection 310. Likewise, for a data transmission between VPC 302 and VPC 306, or VPC 303 and VPC 308, there are, respectively, unique direct connections 312 and 314. For a data transmission between VPC 304 and VPC 306, another direct connection 316 permits the exchange, and a data transmission between VPC 304 and VPC 308 is exchanged via a direct connection 318. Lastly, a unique direct connection 320 is used for data transmissions between VPC 306 and VPC 308. Therefore, each unique pair of entities shares a single unique direct connection. The directionality of the transmission between two entities—either sending or receiving the data transmission—does not change the direct connection or require a different and additional unique connection therebetween.

Illustrative Embodiments of a Method of a Network Architecture

Figure 4:
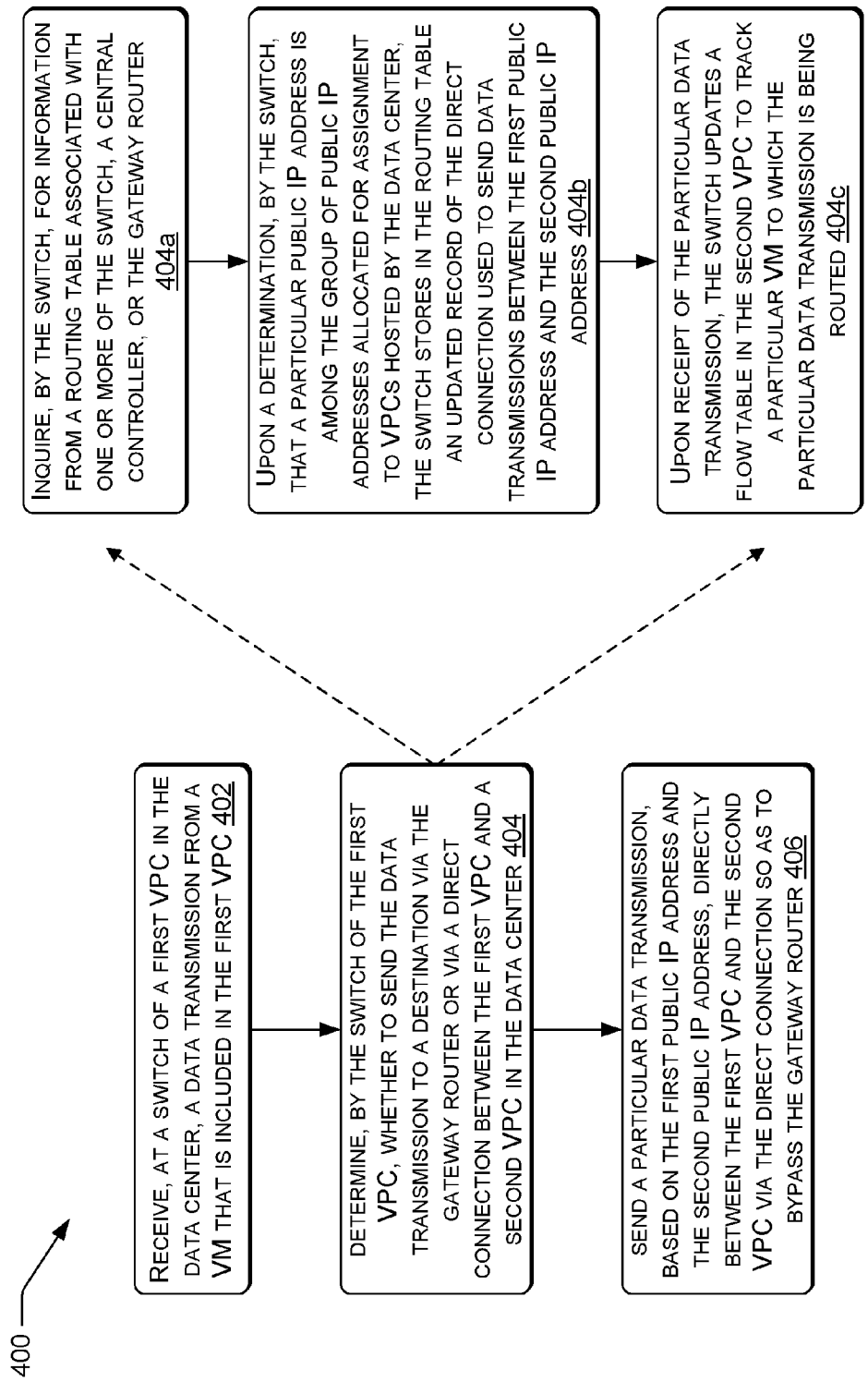
FIG. 4 illustrates an embodiment of a method of a network architecture according to the instant application.

FIG. 4 depicts the flow of an embodiment of a method according to the instant application. In particular, method 400 includes a step 402 of receiving, at a switch of a first VPC in the datacenter, a data transmission from a VM that is included in the first VPC. The first VPC is configured to communicate with a gateway router in the datacenter, and the first VPC is further accessible and identifiable via a first public IP address. In step 404, the switch of the first VPC determines whether to send the data transmission to a destination via the gateway router or via a direct connection between the first VPC and a second VPC in the datacenter. Like the first VPC, the second VPC is configured to communicate with the gateway router, and the second VPC is accessible and identifiable via a second public IP address.

Step 404 may further entail additional steps. For example, step 404 may include a sub-step 404a of inquiring, by the switch, for information from a routing table associated with one or more of the switch, a central controller, or the gateway router. The information indicates whether the destination of a routing packet of the data transmission includes a public IP address that is among the group of public IP addresses allocated for assignment to VPCs hosted by the datacenter. Upon a determination, by the switch, that a particular public IP address is among the group of public IP addresses allocated for assignment to VPCs hosted by the datacenter, the method may further include a sub-step 404b of storing in the routing table an updated record of the direct connection used to send data transmissions between the first public IP address and the second public IP address. Additionally, in case where the second VPC includes a plurality of VMs, upon receipt of the particular data transmission, step 404 further may include a sub-step 404c of updating a flow table in the second VPC to track a particular VM to which the particular data transmission is being routed to avoid splitting up the particular data transmission.

In some instances, method 400 further may include a step 406 of sending a particular data transmission, based on the first public IP address and the second public IP address, directly between the first VPC and the second VPC via the direct connection so as to bypass the gateway router. In the case where the direct connection is used, the first public IP address and the second public IP address are assigned from among a group of public IP addresses allocated for assignment to VPCs hosted by the datacenter.

Additional details of the method steps stated above are described herein below. Specifically, in an instance where data transmissions are being sent between a source VM in source VPC and a destination VM in a destination VPC, the packet flow of data transmissions may be described as follows:

In this illustrative example, it is assumed that the source VM has a private IP address of 10.1.1.1, and the public IP address of the destination VPC is 170.1.1.1. Further, because the data transmission is being sent without passing through the gateway device, there is not a network interface card ("NIC") provisioned for public IP addresses since the public IP addresses are announced by the gateway devices. Thus, when a packet is sent from the source VM, the source IP address is 10.1.1.1 and the destination IP address is 170.1.1.1.

Upon leaving the source VM, the switch on the source VPC captures the packet and performs the following steps to process the packet:

1) The switch looks at the routing table (either internally, on the gateway router, or on the centralized controller) and finds out that the public IP address of the destination is an internal public IP address, which means that the IP address belongs to an entity in the same datacenter;
2) Since one public IP address may be used for multiple VMs for the purpose of load balancing, if multiple VMs are behind the destination public IP address, the switch picks one destination as the forwarding destination; and
3) With the destination VM picked, the switch performs the VXLAN encapsulation using the destination VM information, e.g., host IP address, destination MAC address, etc. The VXLAN ID used for the packet encapsulation is a globally unique VXLAN ID.

When the destination VPC receives the packet, the packet can be identified as public traffic packet from the same datacenter by the unique VXLAN ID. The switch of the destination VPC then performs the VXLAN decapsulation and destination network address translation ("DNAT") to replace the destination public IP address with a destination VM private IP address. When multiple VMs are behind the destination public IP address, the destination VM can be identified using the destination public IP address and the destination MAC address since two VMs on the same VPC cannot use the same MAC address.

Furthermore, the source VPC and the destination VPC each keep a flow table so that the return packet from the destination VPC can be forwarded to the source VM. In particular, the following occurs:

1) When the switch of the destination VPC receives the return packet from the destination VM, since a flow table is kept to save the source VM MAC address, the source VPC private IP address, and the VXLAN ID, the switch of the destination VPC performs the VXLAN encapsulation directly; and
2) When the source VPC receives the return packet from the destination VPC, the switch of the source VPC is able to identify the source VM to forward the return packet by looking up the flow table in the switch of the source VPC. Specifically, in the flow table, the key is the inner packet header.

Note that each host entity, e.g., source VPC and destination VPC, maintains, or has a way to collect the public IP address to VM private IP, and host IP mapping information. This may be accomplished by a control plane enhancement. That is, there is a separation of the control plane and the data plane. In some instances of the instant application, the control plane is managed by a centralized controller.

Conventionally, the controller only distributed the tenant specific public IP address information to each host entity. However, in the instant application, when using the direct connection between two entities, the controller also distributes the global public IP information to each end host VPC. As such, each host VPC is able to directly send the public packets to the other end by using both the tenant specific public IP address and the unique global public IP address. Note that due to a large number of public IP addresses in each datacenter, the controller does not need to distribute all of the mapping in a single distribution. Instead, each host entity can gradually learn the mapping from the controller when needed.

Figure 5:
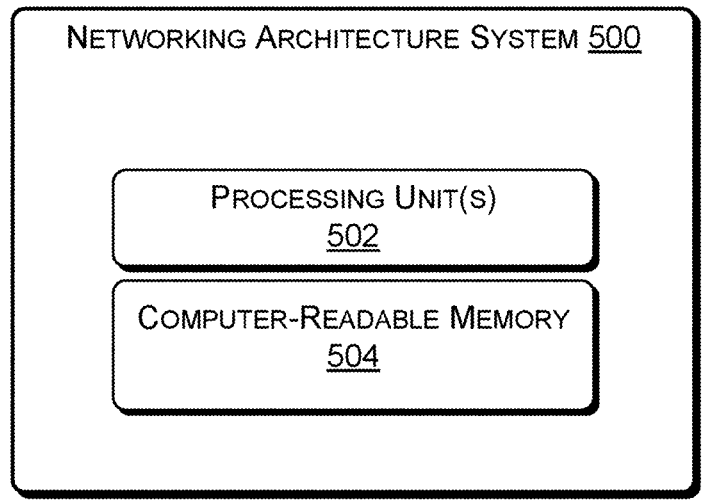
FIG. 5 illustrates an embodiment of a network architecture system according to the instant application.

With respect to FIG. 5, the embodiments of the networking architecture system 5400 described herein may be implemented via one or more processing units 502 based on instructions in computer-readable media 504, which may include, at least, two types of computer-readable media, namely computer storage media and communication media. Computer storage media may include volatile and non-volatile, non-transitory machine-readable, removable, and non-removable media implemented in any method or technology for storage of information (in compressed or uncompressed form), such as computer (or other electronic device) readable instructions, data structures, program modules, or other data to perform processes or methods described herein. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

What is claimed is:

1. A network infrastructure system, comprising:
    a datacenter including one or more processing units, one or more computer-readable storage media, and a gateway router configured to route data transmissions of public network traffic to and from a plurality of virtual private clouds (VPCs) hosted by the datacenter, each VPC being implemented on the one or more computer-readable storage media and executable by the one or more processing units;
    a first VPC of the plurality of VPCs executable by the one or more processing units to communicate with the gateway router, the first VPC being accessible and identifiable via a first public internet protocol address ("IP address"), and the first VPC having a first switch; and
    a second VPC of the plurality of VPCs executable by the one or more processing units to communicate with the gateway router, the second VPC being accessible and identifiable via a second public IP address, and the second VPC having a second switch,
    wherein the first VPC and the second VPC are executable by the one or more processing units to transmit a particular data transmission via a direct connection based on the first public IP address and the second public IP address, directly between the first switch and the second switch so as to bypass the gateway router, and wherein the first public IP address and the second public IP address are assigned from among a group of public IP addresses allocated for assignment to VPCs hosted by the datacenter.

2. The network infrastructure system according to claim 1, wherein the direct connection uses Virtual Extensible Local Area Network ("VXLAN") tunneling technology.

3. The network infrastructure system according to claim 2, wherein the direct connection is assigned a regional globally unique VXLAN ID.

4. The network infrastructure system according to claim 1, wherein the second switch is configured to:
capture a routing packet corresponding to a single data transmission from the second VPC and indicating a destination public IP address of the single data transmission, and
determine whether to route the single data transmission to the destination, based on the destination public IP address indicated in the routing packet, via either the gateway router or the direct connection.

5. The network infrastructure system according to claim 4, wherein the first VPC includes a plurality of virtual machines ("VM") that send and receive the data transmissions, and
wherein the first VPC stores a flow table that indicates which VM of the plurality of VMs receives the respective data transmissions.

6. The network infrastructure system according to claim 4, wherein the second switch is further configured such that, upon capture of the single data transmission, the switch obtains information from a routing table in a cache memory to determine whether the destination public IP address is among the group of public IP addresses allocated for assignment to VPCs hosted by the datacenter.

7. The network infrastructure system according to claim 6, wherein one of the second switch, a controller connected with the gateway router and the plurality of VPCs, or the gateway router includes the cache memory and routing table from which the second switch obtains the information.

8. The network infrastructure system according to claim 6, wherein the second switch includes the routing table that tracks the obtained information, thereby forming an index of connections between VPCs internal to the datacenter based on the public IP addresses that are among the group of public IP addresses allocated for assignment to VPCs hosted by the datacenter.

9. The network infrastructure system according to claim 1, wherein the datacenter is a regional datacenter such that the first VPC and the second VPC are within a same region.

10. A system, comprising:
a plurality of virtual private clouds (VPCs) hosted by a regional datacenter including one or more processing units, one or more computer-readable storage media, and a gateway router configured to transmit data transmissions of public network traffic to and from the plurality of VPCs, a distinct public internet protocol address ("IP address") being assigned to at least two VPCs of the plurality of VPCs, respectively, the public IP addresses being assigned from among a group of public IP addresses allocated for assignment to VPCs internally hosted by the regional datacenter, the at least two VPCs being implemented on the one or more computer-readable storage media and executable by the one or more processing units, the at least two VPCs being accessible and identifiable, via the gateway router, to network-enabled devices located internal to the regional datacenter and network-enabled devices located external to the regional datacenter, and each of the at least two VPCs having a respective switch,
wherein, for each distinct pair of VPCs having distinct public IP addresses, including the at least two VPCs, the pair of VPCs are each executable by the one or more processing units to transmit a particular data transmission via a direct connection directly between the respective switches of the distinct pair of VPCs so as to bypass the gateway router.

11. The system according to claim 10, wherein each switch is a virtual switch configured to:
capture routing packets that correspond to respective data transmissions and that indicate a respective destination public IP address, and
determine whether to route the data transmissions to the respective destinations, based on the destination public IP address indicated in the routing packet, via either the gateway router or the direct connection.

12. The system according to claim 11, wherein, to determine whether to route the data transmissions via the gateway router or the direct connection, the switch is configured to inquire for information from a routing table found in one or more of:
the switch,
a centralized controller, or
the gateway router.

13. The system according to claim 12, wherein, upon a determination, by a particular routing table, that a particular public IP address is among the group of public IP addresses allocated for assignment to VPCs hosted by the datacenter, the particular routing table is updated to maintain a record of the direct connection used to send data transmissions associated with the particular public IP address.

14. A method of directly routing network traffic between virtual private clouds (VPCs) within a datacenter, comprising:
receiving, at a first switch of a first VPC in the datacenter, a data transmission from a virtual machine ("VM") that is included in the first VPC, the first VPC being configured to communicate with a gateway router in the datacenter, and the first VPC being accessible and identifiable via a first public internet protocol address ("IP address");
determining, by the first switch of the first VPC, whether to send the data transmission to a destination via the gateway router or via a direct connection between the first VPC and a second VPC in the datacenter, the second VPC being configured to communicate with the gateway router, and the second VPC being accessible and identifiable via a second public IP address; and
sending a particular data transmission, based on the first public IP address and the second public IP address, directly between the first switch and a second switch of the second VPC via the direct connection so as to bypass the gateway router,
wherein the first public IP address and the second public IP address are assigned from among a group of public IP addresses allocated for assignment to VPCs hosted by the datacenter.

15. The method according to claim 14, wherein the determining includes inquiring, by the first switch, for information from a routing table associated with one or more of the first switch, a central controller, or the gateway router, the information indicating whether the destination of a routing packet of the data transmission includes a public IP address that is among the group of public IP addresses allocated for assignment to VPCs hosted by the datacenter.

16. The method according to claim 15, wherein, upon a determination, by the first switch, that a particular public IP address is among the group of public IP addresses allocated for assignment to VPCs hosted by the datacenter, the method further comprises storing in the routing table an updated record of the direct connection used to send data transmissions between the first public IP address and the second public IP address.

17. The method according to claim 14, wherein the direct connection uses Virtual Extensible Local Area Network ("VXLAN") tunneling technology.

18. The method according to claim 17, wherein the direct connection is assigned a regional globally unique VXLAN ID.

19. The method according to claim 14, wherein the second VPC includes a plurality of VMs, and wherein, upon receipt of the particular data transmission, the method further comprises updating a flow table in the second VPC to track a particular VM to which the particular data transmission is being routed to avoid splitting up the particular data transmission.

20. The method according to claim 14, wherein the sending is based on whether both of the first VPC and the second VPC are located in a same region.

21. One or more computer-readable storage media having instructions, which when executed, cause one or more processing units to perform acts, comprising:

receiving, at a first switch of a first VPC in the datacenter, a data transmission from a virtual machine ("VM") that is included in the first VPC, the first VPC being configured to communicate with a gateway router in the datacenter, and the first VPC being accessible and identifiable via a first public internet protocol address ("IP address");

determining, by the first switch of the first VPC, whether to send the data transmission to a destination via the gateway router or via a direct connection between the first switch and a second switch of the second VPC in the datacenter, the second VPC being configured to communicate with the gateway router, and the second VPC being accessible and identifiable via a second public IP address; and sending a particular data transmission, based on the first public IP address and the second public IP address, directly between the first switch and the second switch via the direct connection so as to bypass the gateway router, wherein the first public IP address and the second public IP address are assigned from among a group of public IP addresses allocated for assignment to VPCs hosted by the datacenter.

22. The one or more computer-readable storage media according to claim 21, wherein the determining includes inquiring, by the first switch, for information from a routing table associated with one or more of the first switch, a central controller, or the gateway router, the information indicating whether the destination of a routing packet of the data transmission includes a public IP address that is among the group of public IP addresses allocated for assignment to VPCs hosted by the datacenter.

23. The one or more computer-readable storage media according to claim 22, wherein, upon a determination, by the first switch, that a particular public IP address is among the group of public IP addresses allocated for assignment to VPCs hosted by the datacenter, the acts further include storing in the routing table an updated record of the direct connection used to send data transmissions between the first public IP address and the second public IP address.

24. The one or more computer-readable storage media according to claim 21, wherein the second VPC includes a plurality of VMs, and wherein, upon receipt of the particular data transmission, the acts further include updating a flow table in the second VPC to track a particular VM to which the particular data transmission is being routed to avoid splitting up the particular data transmission.

* * * * *